US012108503B2

(12) United States Patent
Thurk

(10) Patent No.: US 12,108,503 B2
(45) Date of Patent: Oct. 1, 2024

(54) INDEPENDENT LIGHTING CONTROL

(71) Applicant: Electronic Theatre Controls, Inc., Middleton, WI (US)

(72) Inventor: John P. Thurk, Fitchburg, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 49 days.

(21) Appl. No.: 18/068,561

(22) Filed: Dec. 20, 2022

(65) Prior Publication Data

US 2024/0206029 A1 Jun. 20, 2024

(51) Int. Cl.
*H05B 45/14* (2020.01)
*H05B 45/325* (2020.01)
*H05B 45/39* (2020.01)

(52) U.S. Cl.
CPC ........... *H05B 45/14* (2020.01); *H05B 45/325* (2020.01); *H05B 45/39* (2020.01)

(58) Field of Classification Search
CPC ........ H05B 45/42; H05B 45/30; H05B 45/14; H05B 45/325; H05B 45/39
See application file for complete search history.

(56) References Cited

U.S. PATENT DOCUMENTS

| | | | |
|---|---|---|---|
| 8,159,139 | B2 | 4/2012 | Blaut et al. |
| 8,754,585 | B1 | 6/2014 | Bahrehmand |
| 8,823,281 | B2 | 9/2014 | Peting et al. |
| 9,072,142 | B2 | 6/2015 | Zijlstra et al. |
| 9,578,701 | B1 | 2/2017 | Logiudice et al. |
| 9,706,613 | B2 | 7/2017 | Gibbs |
| 10,136,485 | B1 | 11/2018 | Coetzee et al. |
| 10,278,244 | B1 | 4/2019 | Bahrehmand |

(Continued)

FOREIGN PATENT DOCUMENTS

| | | | |
|---|---|---|---|
| CN | 111654948 | A | 9/2020 |
| DE | 202012101221 | U1 | 5/2012 |

(Continued)

OTHER PUBLICATIONS

United Kingdom Intellectual Property Office Action for Application No. 2314738.2 dated Mar. 12, 2024 (5 pages).

(Continued)

*Primary Examiner* — Abdullah A Riyami
*Assistant Examiner* — Syed M Kaiser
(74) *Attorney, Agent, or Firm* — Michael Best & Friedrich LLP

(57) ABSTRACT

A lighting control system having a driver for independently controlling multiple light sources. One lighting control system includes an input capable of being driven in a first polarity and a second polarity reversed from the first polarity, a first light source connected to the input and configured to generate light when driven at the first polarity, and a second light source connected to the input and configured to generate light when driven at the second polarity. The lighting control system includes a steering bridge connected to the input and configured to control the polarity of the input, and a controller connected to the steering bridge. The controller is configured to control, based on a steering drive command, the steering bridge, and provide, to the input, lighting control signals to independently control the first light source and the second light source.

20 Claims, 20 Drawing Sheets

(56) References Cited

U.S. PATENT DOCUMENTS

| | | | | |
|---|---|---|---|---|
| 10,314,127 | B2 | 6/2019 | Zheng | |
| 10,491,032 | B2 * | 11/2019 | Chen | H05B 45/10 |
| 10,667,362 | B1 * | 5/2020 | Coetzee | H05B 45/39 |
| 10,750,592 | B1 | 8/2020 | Price et al. | |
| 10,841,998 | B1 | 11/2020 | Vollmer et al. | |
| 11,140,758 | B2 | 10/2021 | Qiu et al. | |
| 11,415,274 | B2 | 8/2022 | Shao | |
| 2007/0080652 | A1 | 4/2007 | Elferich et al. | |
| 2008/0258643 | A1 | 10/2008 | Cheng et al. | |
| 2009/0179593 | A1 | 7/2009 | Yang | |
| 2010/0079085 | A1 | 4/2010 | Wendt et al. | |
| 2011/0221358 | A1 | 9/2011 | Yang et al. | |
| 2013/0009560 | A1 | 1/2013 | Takeda et al. | |
| 2015/0163880 | A1 | 6/2015 | Sun et al. | |
| 2016/0234895 | A1 | 8/2016 | Delos Ayllon et al. | |
| 2017/0273154 | A1 * | 9/2017 | Miskin | H05B 45/00 |
| 2018/0007753 | A1 | 1/2018 | Kuang et al. | |
| 2021/0043821 | A1 | 2/2021 | Hussell et al. | |
| 2021/0360757 | A1 | 11/2021 | Bennette et al. | |
| 2022/0117063 | A1 | 4/2022 | Park et al. | |
| 2022/0124891 | A1 | 4/2022 | Delvaux | |
| 2023/0041543 | A1 | 2/2023 | Sun et al. | |
| 2023/0043038 | A1 | 2/2023 | Marry | |

FOREIGN PATENT DOCUMENTS

| | | | | |
|---|---|---|---|---|
| EP | 2489241 | B1 | 11/1989 | |
| EP | 2814300 | A1 | 12/2014 | |
| EP | 2761978 | A1 | 4/2016 | |
| WO | WO-2012069961 | A1 * | 5/2012 | H05B 33/0827 |

OTHER PUBLICATIONS

German Patent Office Action for Application No. 102023132812.3 dated Jun. 19, 2024 (7 pages with Statement of Relevance).

* cited by examiner

INDEPENDENT LIGHTING CONTROL

FIELD

Embodiments described herein relate to a lighting control system having a driver for independently controlling multiple light sources.

SUMMARY

Embodiments described herein provide for controlling multiple light sources using a single driver output. For example, two or more light sources may share a single input node. A steering bridge circuit reverses the polarity of current provided to the input node. Additionally, a driver circuit generates independent control signals for each light source that is provided to the steering bridge. This provides for independent control of each light source using a single closed electrical connection (for example, a single pair of wires). In some implementations, a controller further controls whether a light source receives current based on a current value or voltage value provided to the input node. The light sources, the steering bridge, the driver circuit, and the controller may be situated within a shared luminaire housing.

One embodiment provides a lighting control system comprising an input capable of being driven in a first polarity and a second polarity reversed from the first polarity, a first light source connected to the input and configured to generate light when driven at the first polarity, and a second light source connected to the input and configured to generate light when driven at the second polarity. The lighting control system includes a steering bridge connected to the input and configured to control the polarity of the input, and a controller connected to the steering bridge. The controller is configured to control, based on a steering drive command, the steering bridge, and provide, to the input, lighting control signals to independently control the first light source and the second light source.

Another embodiment provides a lighting control system comprising a first light source, a second light source, a driver circuit configured to independently drive the first light source and the second light source, and a sensing circuit. The sensing circuit is configured to sense a characteristic of the driver circuit, connect the first light source to the driver circuit when the characteristic of the driver circuit is less than a threshold, and connect the second light source to the driver circuit when the characteristic of the driver circuit is greater than or equal to the threshold.

Another embodiment provides a lighting control system comprising an input capable of being driven in a first polarity and a second polarity reversed from the first polarity, a first light source connected to the input and configured to generate light when driven at the first polarity, and a second light source connected in anti-series to the first light source and configured to generate light when driven at the second polarity. The lighting control system includes a steering bridge connected to the input and configured to independently drive the first light source and the second light source and a sensing circuit configured to sense a characteristic of the input. The lighting control system includes a controller connected to the steering bridge, the sensing circuit, and the input. The controller is configured to control, via the steering bridge, a polarity of the input, receive, via the sensing circuit, a signal indicative of the characteristic of the steering bridge, connect the first light source to the input when the characteristic of the input is less than a threshold, and connect the second light source to the input when the characteristic of the input is greater than or equal to the threshold.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practice or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of different structural components, may be utilized to implement the disclosure. Furthermore, and as described in subsequent paragraphs, the specific configurations illustrated in the drawings are intended to exemplify implementations of the disclosure. Alternative configurations are possible.

Other aspects of the embodiments will become apparent by consideration of the detailed description and accompanying drawings.

DETAILED DESCRIPTION

Before any aspects of the disclosure are explained in detail, it is to be understood that the disclosure is not limited in its application to the details of construction and the arrangement of components set forth in the following description or illustrated in the following drawings. The disclosure is capable of supporting other aspects and being practiced or being carried out in various ways. Also, it is to be understood that the phraseology and terminology used herein is for the purpose of description and should not be regarded as limiting.

Figure 1:
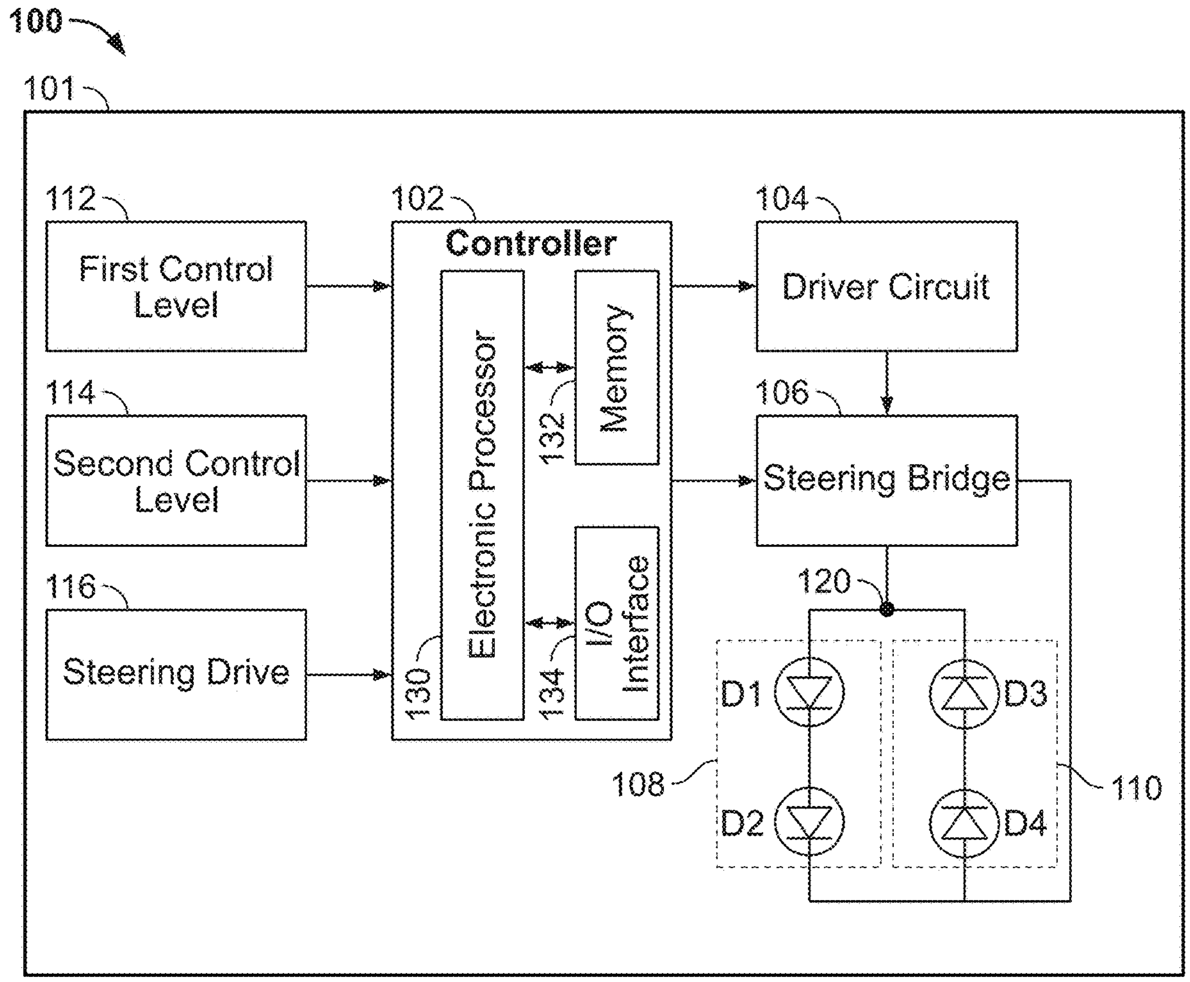
FIG. 1 is a block diagram of a lighting control system, in accordance with some embodiments.

FIG. 1 provides a lighting control system 100 according to one example. The lighting control system 100 may include a controller 102, a driver circuit 104, a steering bridge 106, a first light source 108, and a second light source 110. In some instances, the controller 102, the driver circuit 104, the steering bridge 106, the first light source 108, and the second light source 110 are situated within a luminaire housing 101. In other instances, components of the lighting control system 100 may be situated outside the luminaire housing 101. The controller 102 may receive, among other things, a first control level 112, a second control level 114, and a steering drive command 116. In some embodiments, the first control level 112, the second control level 114, and/or the steering drive command 116 are received from a user interface included in, or otherwise connected to, the lighting control system 100. The first control level 112, the second control level 114, and/or the steering drive command 116 are received from an external device via a data connection (e.g., a wired connection via ethernet, a wireless connection, or the like). The external device may be, for example, a wall station, a lighting control console, an architectural control system, or the like. The controller 102 generates commands to control the driver circuit 104 and the steering bridge 106 based on the first control level 112, the second control level 114, and the steering drive command 116, as described below in more detail.

In some implementations, the controller 102 includes, among other things, an electronic processor 130, a memory 132, and an input/output interface 134. The electronic processor 130, the memory 132, the input/output interface 134, as well as the various modules connected to the controller 102 are connected by one or more control and/or data buses (for example, a common bus). The input/output interface 134 includes routines for transferring information between components within the controller 102 and other components of the lighting control system 100. In some implementations, the controller 102 is implemented partially or entirely on a semiconductor (for example, a field-programmable gate array ["FPGA"] semiconductor) chip.

The memory 132 includes, for example, read-only memory (ROM), random access memory (RAM) (for example, dynamic RAM [DRAM], synchronous DRAM [SDRAM], etc.), electronically erasable programmable read-only memory (EEPROM), flash memory, a hard disk, an SD card, other non-transitory computer-readable media, or a combination thereof. The electronic processor 130 is connected to the memory 132 and executes software instructions that are capable of being stored in a RAM of the memory 132 (for example, during execution), a ROM of the memory 132 (for example, on a generally permanent basis), or another non-transitory computer-readable medium such as another memory or a disc. Alternatively or in addition, the memory 132 is included in the electronic processor 130. Software included in some implementations of the lighting control system 100 can be stored in the memory of the controller 102. The software includes, for example, firmware, one or more applications, program data, filters, rules, one or more program modules, and other executable instructions. In other constructions, the controller 102 includes additional fewer, or different components. For example, the controller 102 may be comprised of only hardware components, such as switches and logical gates.

The driver circuit 104 may be, for example a constant current (CC) driver, a constant voltage (CV) driver, an analog voltage driver, an analog current driver, or a combination thereof. The driver circuit 104 is configured to control the first light source 108 and/or the second light source 110 based on commands from the controller 102. For example, the driver circuit 104 may vary the current provided to the first light source 108 and the second light source 110 by varying the amplitude of the current or the duty cycle of a pulse width modulated (PWM) voltage. In some embodiments, the controller 102 performs the operations of the driver circuit 104 or the driver circuit 104 is implemented into the controller 102.

The steering bridge 106 may be a circuit that alternatively steers voltage and current (for example AC current) to the first light source 108 and the second light source 110. For example, in the example of FIG. 1, the first light source 108 includes a first light emitting diode (LED) D1 and a second LED D2 having a first polarity such that current only flows through the first light source 108 when the current is positive. The second light source 110 includes a third LED D3 and a fourth LED D4 having a second polarity such that currently only flows through the second light source 110 when the current is negative. The first light source 108 and the second light source 110 are connected at an input node 120. The steering bridge 106 controls the polarity of the current provided to the input node 120 to independently drive each light source.

Figure 2:
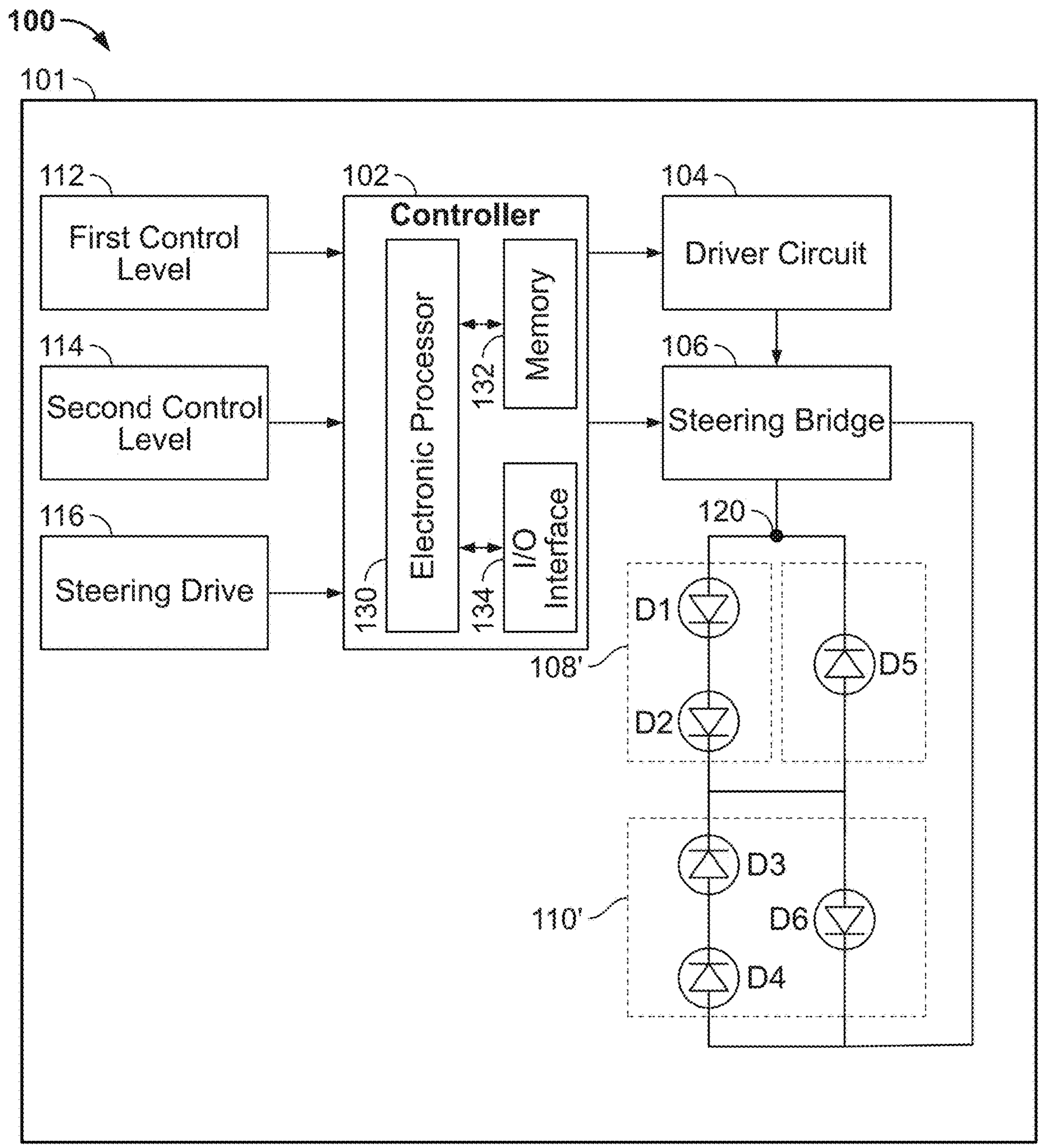
FIG. 2 is a block diagram of another lighting control system, in accordance with some embodiments.

In the example of FIG. 1, the first light source 108 and the second light source 110 are connected in parallel (or, more specifically, anti-parallel due to the opposite polarities). However, in other examples, the first light source 108 and the second light source 110 may instead be connected in series (or, more specifically, anti-series due to the opposite polarities). For example, FIG. 2 provides the lighting control system 100 having a first light source 108' and a second light source 110'. The first light source 108' includes a first LED D1, a second LED D2, and a first diode D5. The second light source 110' includes a third LED D3, a fourth LED D4, and a sixth diode D6. The fifth diode D5 and the sixth diode D6 provide a path for current regardless of the polarity of the current. Specifically, when the current provided to the input node 120 has a positive polarity, the current flows through the first LED D1, the second LED D2 and the sixth diode D6, therefore bypassing the third LED D3 and the fourth LED D4. When the current provided to the input node 120 has a negative polarity, the current flows through the third LED D3, the fourth LED D4, and the fifth diode D5, therefore bypassing the first LED D1 and the second LED D2.

While the first light source 108 and the second light source 110 are shown to include two LEDs, in some implementations, the first light source 108 and the second light source 110 include more or fewer LEDs. Additionally, the lighting control system 100 may include more than two light sources. The light sources included within the lighting control system 100 may henceforth be referred collectively to as a lighting array or an LED array.

Figure 3:
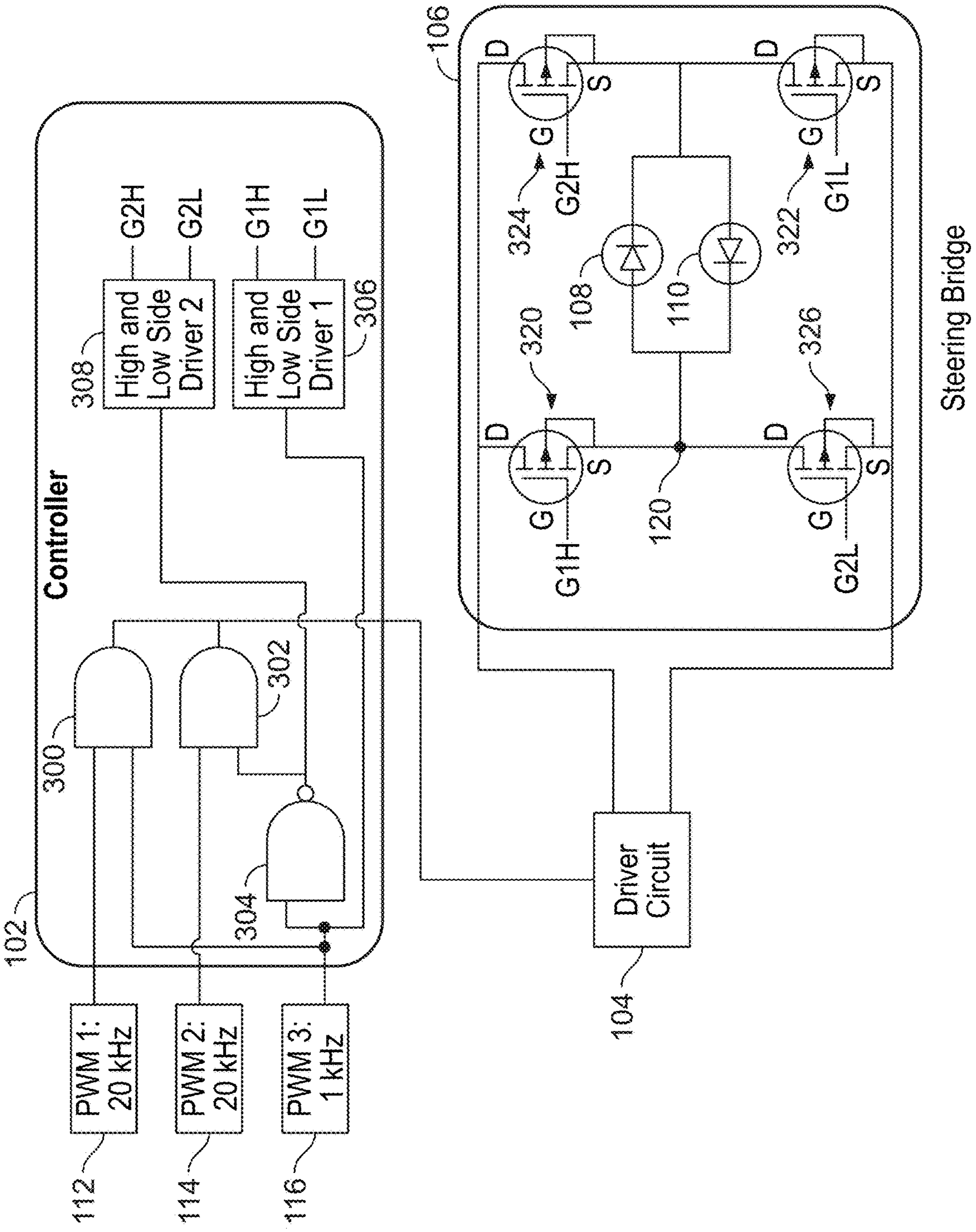
FIG. 3 is a circuit diagram of the lighting control system of FIG. 1, in accordance with some embodiments.

FIG. 3 illustrates an example circuit diagram for implementing the lighting control system 100. In the example of FIG. 3, the driver circuit 104 is configured as a constant current LED driver. The controller 102 includes a plurality of logical hardware, such as a first AND gate 300, a second AND gate 302, and a NAND gate 304. Additionally, in the example of FIG. 3, the first control level 112 is a 20 kHz PWM signal, the second control level 114 is a 20 KHZ PWM signal, and the steering drive command 116 is a 1 kHz PWM signal. The first AND gate 300 receives the first control level 112 and the steering drive command 116 as inputs. The second AND gate 302 receives the second control level 114 and the output of the NAND gate 304 as inputs. The NAND gate 304 receives the steering drive command 116 as both inputs, ensuring the output of the NAND gate 304 is always the opposite of the value of the steering drive command 116. The outputs of the first AND gate 300 and the second AND gate 302 are provided to the driver circuit 104.

The controller 102 may also include a first high and low side (HL) driver 306 and a second HL driver 308 for driving the steering bridge 106. The steering bridge 106 may include a first high side field-effect transistor (FET) 320, a first low side FET 322, a second high side FET 324, and a second low side FET 326. The first HL driver 306 generates a G1H signal provided to the gate of the first high side FET 320 for controlling the first high side FET 320. The first HL driver 306 also generates a G1L signal provided to the gate of the first low side FET 322 for controlling the first low side FET 322. The second HL driver 308 generates a G2H signal provided to the gate of the second high side FET 324 for controlling the second high side FET 324. The second HL driver 308 also generates a G2L signal provided to the gate of the second low side FET 326 for controlling the second low side FET 326. In some embodiments, rather than FETs, the steering bridge 106 is comprised of a different type of appropriate switching device, such as bipolar transistor, a metal-oxide-semiconductor FET (MOSFET), a junction-gate FET (JFET), or the like.

The controller 102 controls the FETs included in the steering bridge 106 to control whether the first light source 108 or the second light source 110 receives power. Additionally, the driver circuit 104 generates commands for either the first light source 108 or the second light source 110 based on signals from the controller 102. The commands generated by the driver circuit 104 are provided to input node 120. Accordingly, by controlling the driver circuit 104 and the steering bridge 106 concurrently, the controller 102 manages independent control of the first light source 108 and the second light source 110.

Figure 4:
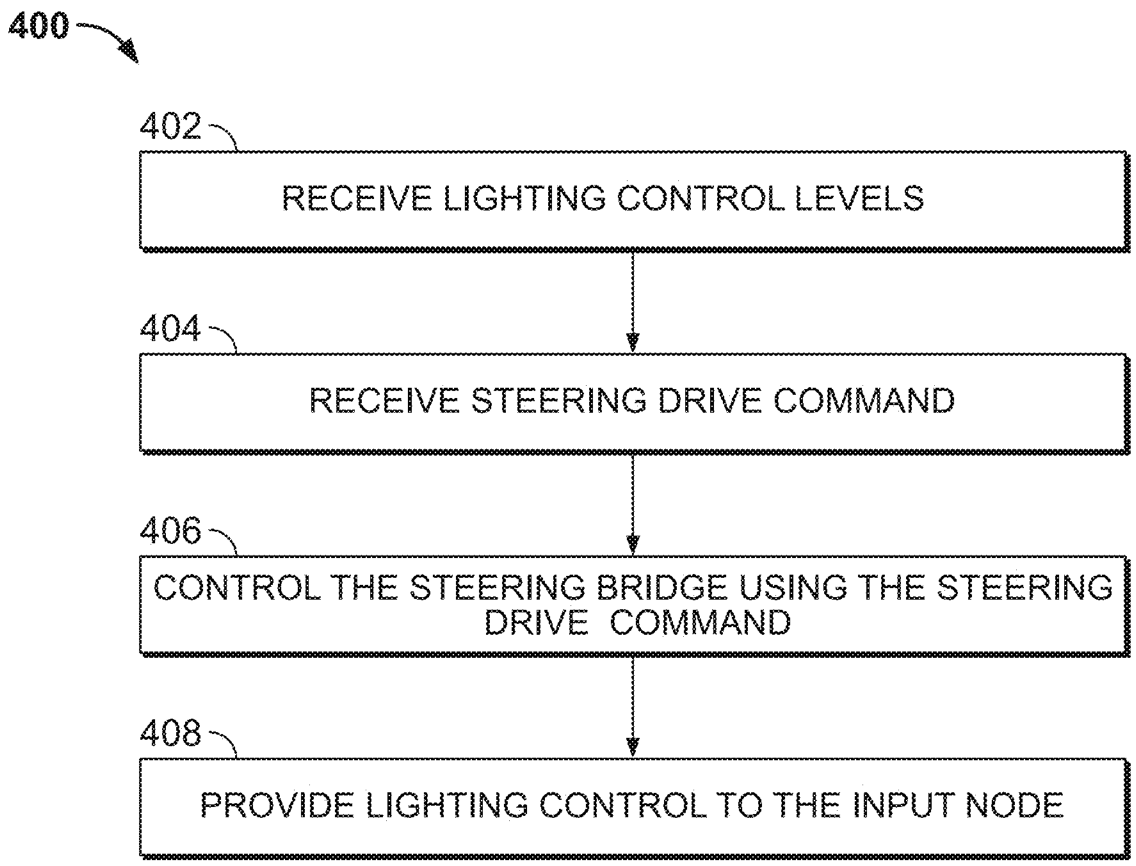
FIG. 4 is a flow chart of a method performed by the lighting control system of FIG. 1, in accordance with some embodiments.

FIG. 4 provides a method 400 for operating the lighting control system 100 in accordance with some embodiments. The method 400 may be performed by the controller 102, the driver circuit 104, the steering bridge 106, or a combination thereof. The steps of the method 400 are described in an iterative manner for descriptive purposes. Various steps described herein with respect to the method 400 are capable of being executed simultaneously, in parallel, or in an order that differs from the illustrated serial and iterative manner of execution.

At block 402, the controller 102 receives lighting control levels. For example, when two light sources are present, the controller 102 receives the first control level 112 and the second control level 114. At block 404, the controller 102 receives steering drive command 116.

At block 406, the controller 102 controls the steering bridge 106 using the steering drive command 116. For example, the controller 102 controls the steering bridge 106 to reverse the polarity at the input node 120 according to the steering drive command 116. At block 408, the controller 102 provides lighting control to the input node 120. For example, the controller 102 provides the first control level 112 and the second control level 114 to the driver circuit 104. The driver circuit 104 generates commands for controlling the first light source 108 and/or the second light source 110 that are provided to the input node 120.

Figure 5:
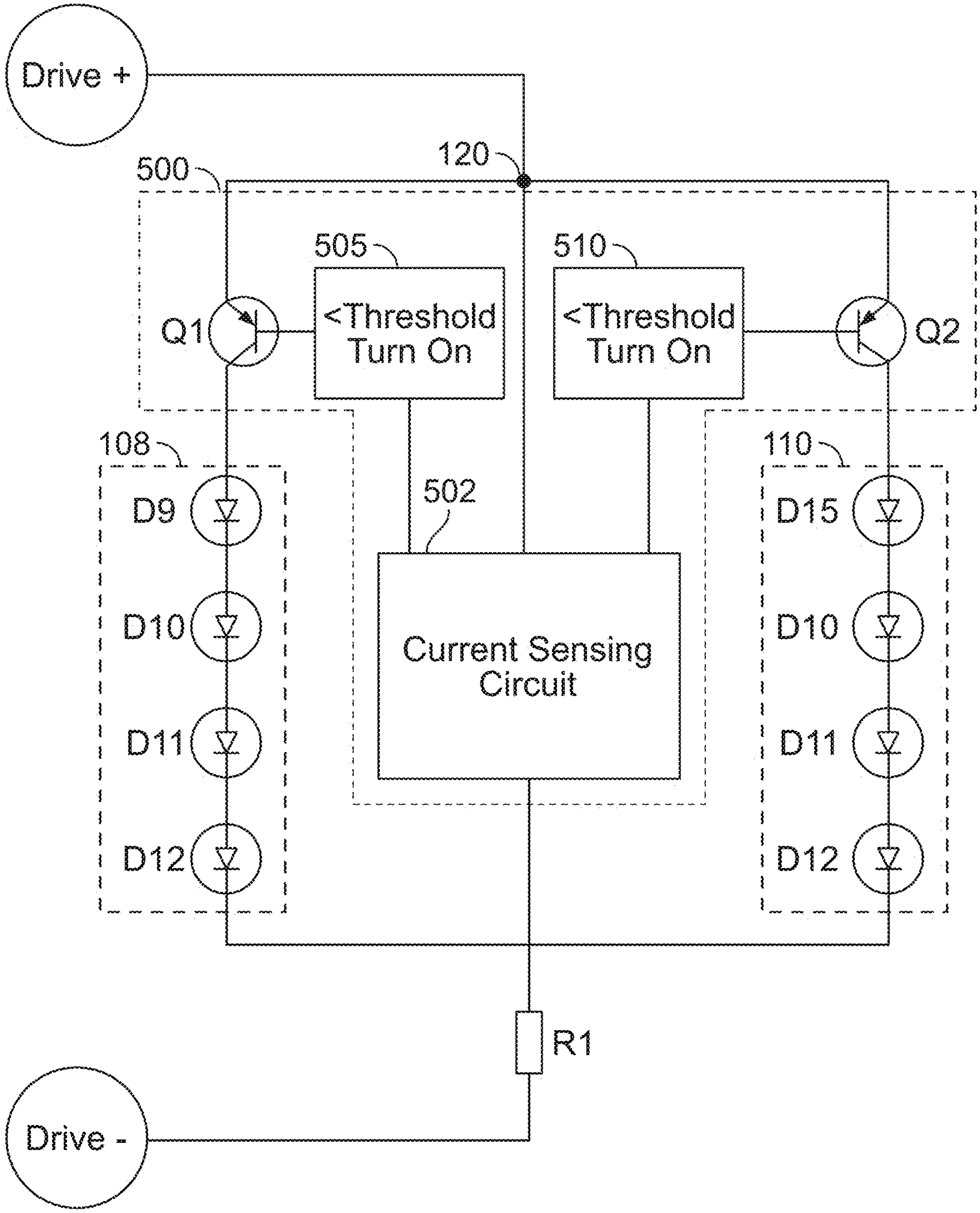
FIG. 5 is a block diagram of a light array having a characteristic sensing circuit, in accordance with some embodiments.

In some instances, the lighting control system 100 includes a drive splitter circuit for connecting or disconnecting the first light source 108 and the second light source 110 from the input node 120. FIG. 5 provides an example drive splitter circuit 500. As illustrated, the drive splitter circuit 500 may include a current sensing circuit 502, a first comparator 505, a second comparator 510, a first switch Q1, a second switch Q2. A current flowing through the lighting array from the driver circuit 104 flows through a current sense resistor R1. The current sensing circuit 502 detects a voltage value of the current sense resistor R1 indicative of a value of the current flowing through the lighting array. The voltage value is provided to the first comparator 505 and the second comparator 510. The first comparator 505 compares the voltage value to a first threshold (for example, a voltage value indicative of a current of 750 mA). When the voltage value is less than the first threshold, the first comparator 505 controls the first switch Q1 to an ON state, allowing current to flow through the first light source 108. When the voltage value is greater than the first threshold, the first comparator 505 controls the first switch Q1 to an OFF state, stopping the flow of current through the first light source 108.

Additionally, the second comparator 510 compares the voltage value to the first threshold. When the voltage value is greater than the first threshold, the second comparator 510 controls the second switch Q2 to an ON state, allowing current to flow through the second light source 110. When the voltage value is less than the first threshold, the second comparator 510 controls the second switch Q2 to an OFF state, stopping the flow of current through the second light source 110.

Accordingly, in the example of FIG. 5, the drive splitter circuit 500 connects either the first light source 108 or the second light source 110 to the input node 120 based on a characteristic of the driver circuit 104 (e.g., a current provided by the driver circuit 104, a voltage provided by the driver circuit 104, etc.). In other embodiments, the first comparator 505 and the second comparator 510 may compare the output of the current sensing circuit 502 to different threshold values. Additionally, when more than two light sources are provided, more comparators may be provided with unique threshold values to independently connect each light source to the input node 120. In some instances, the thresholds of the first comparator 505 and the second comparator 510 may overlap such that current is provided to both the first light source 108 and the second light source 110. For example, the first comparator 505 may control the first switch Q1 to an ON position when the current is less than approximately 800 mA, while the second comparator 510 may control the second switch Q2 to an ON position when the current is greater than approximately 600 mA. Accordingly, both the first switch Q1 and the second switch Q2 are ON when the current is approximately 700 mA at the current sense resistor R1, and both the first light source 108 and the second light source 110 receive current.

Figure 6:
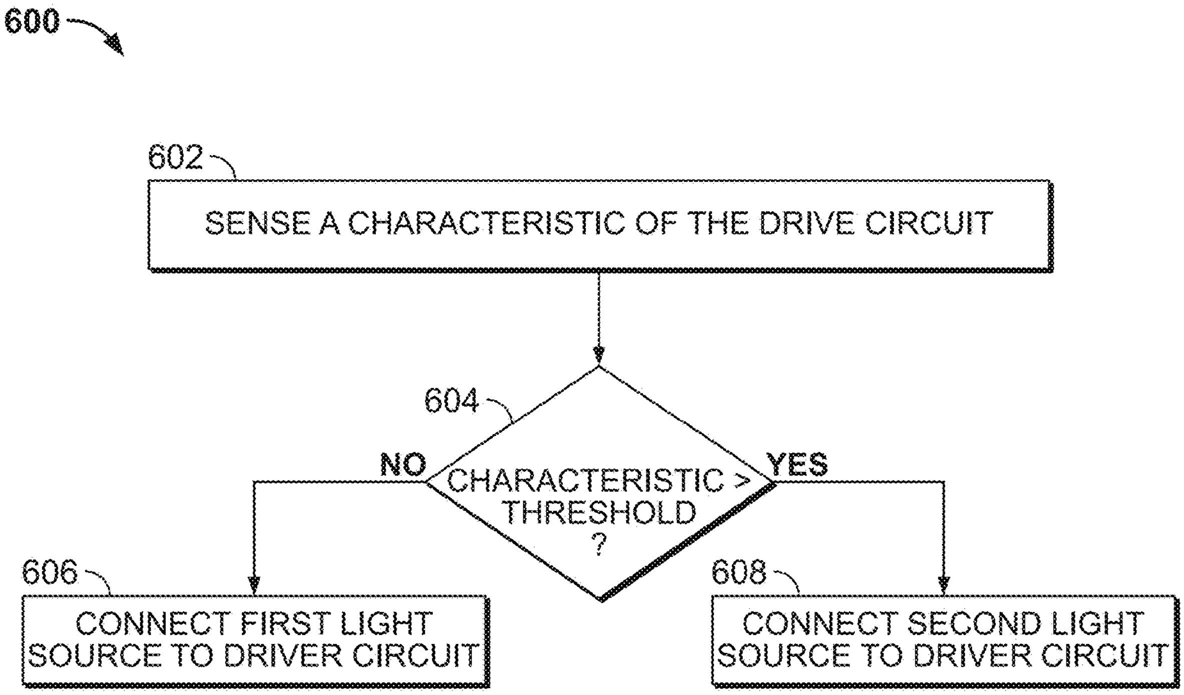
FIG. 6 is a flow chart of a method performed by the characteristic sensing circuit of FIG. 5, in accordance with some embodiments.

FIG. 6 provides a method 600 performed by the drive splitter circuit 500 in accordance with some embodiments. The steps of the method 400 are described in an iterative manner for descriptive purposes. Various steps described herein with respect to the method 600 are capable of being executed simultaneously, in parallel, or in an order that differs from the illustrated serial and iterative manner of execution.

At block 602, the drive splitter circuit 500 senses a characteristic of the driver circuit 104. For example, the current sensing circuit 502 senses a current provided by the driver circuit 104. In some embodiments, the current sensing circuit 502 senses the current at the input node 120. At block 604, the drive splitter circuit 500 compares the characteristic of the driver circuit to a threshold. When the characteristic of the driver circuit is less than the threshold, the drive splitter circuit 500 proceeds to block 606. When the characteristic of the driver circuit is greater than the threshold, the drive splitter circuit 500 proceeds to block 608.

At block 606, when the characteristic of the driver circuit 104 is less than the threshold, the drive splitter circuit 500 connects the first light source 108 to the driver circuit 104. For example, the first comparator 505 controls the first switch Q1 to an ON state to connect the first light source 108 to the input node 120. The second comparator 510 controls the second switch Q2 to an OFF state to disconnect the second light source 110 from the input node 120. At block 608, when the characteristic of the driver circuit 104 is greater than the threshold, the drive splitter circuit 500 connects the second light source 110 to the driver circuit 104. For example, the first comparator 505 controls the first switch Q1 to an OFF state to disconnect the first light source 108 from the input node 120. The second comparator 510 controls the second switch Q2 to an ON state to connect the second light source 110 to the input node 120. In some embodiments, once the driver circuit 104 is connected to the first light source (block 606) or the second light source (block 608), method 600 may cycle back to block 602.

Figure 7A:
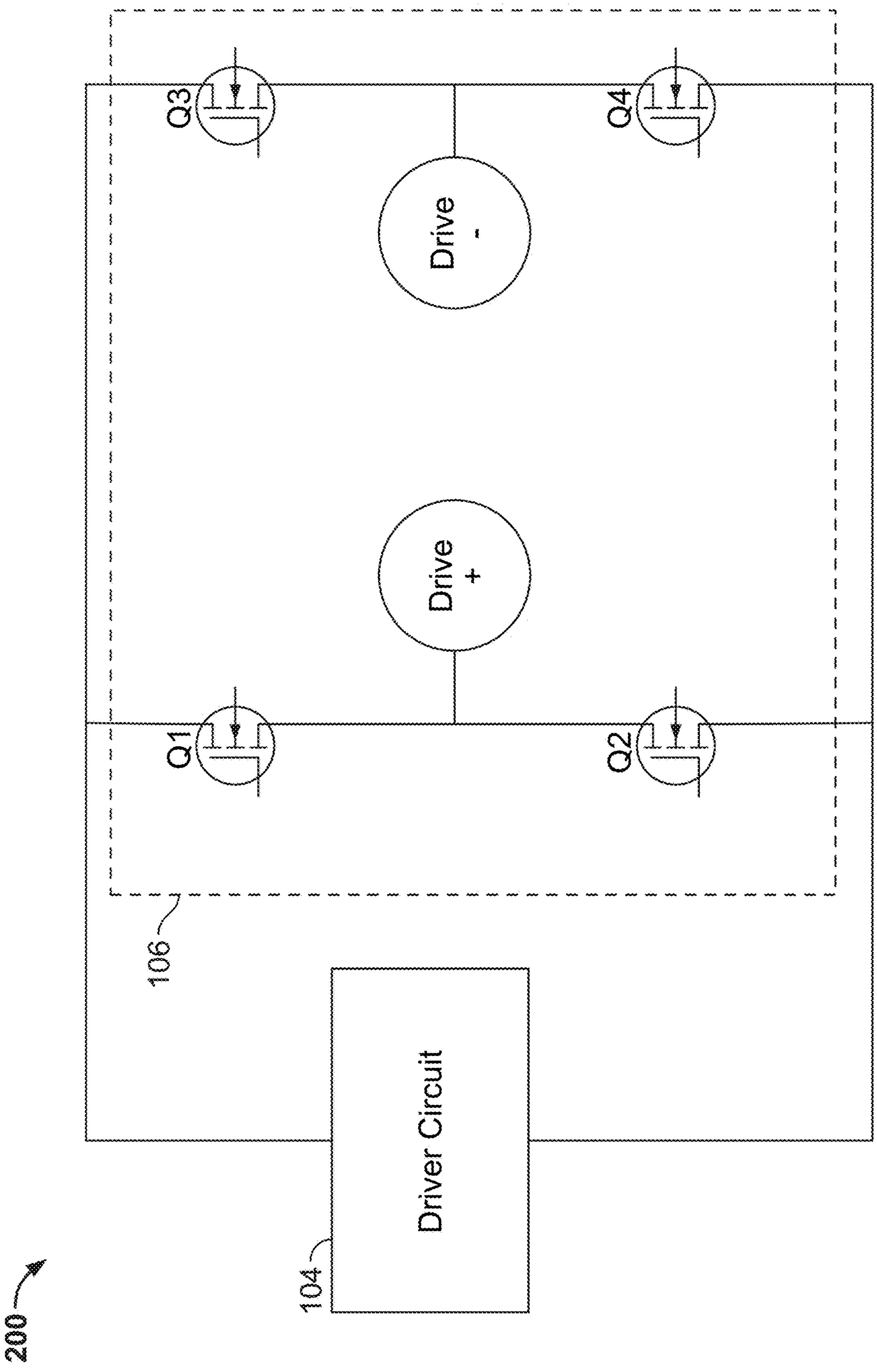
FIGS. 7A-7B is a block diagram of a lighting control system, in accordance with some embodiments.
Figure 7B:
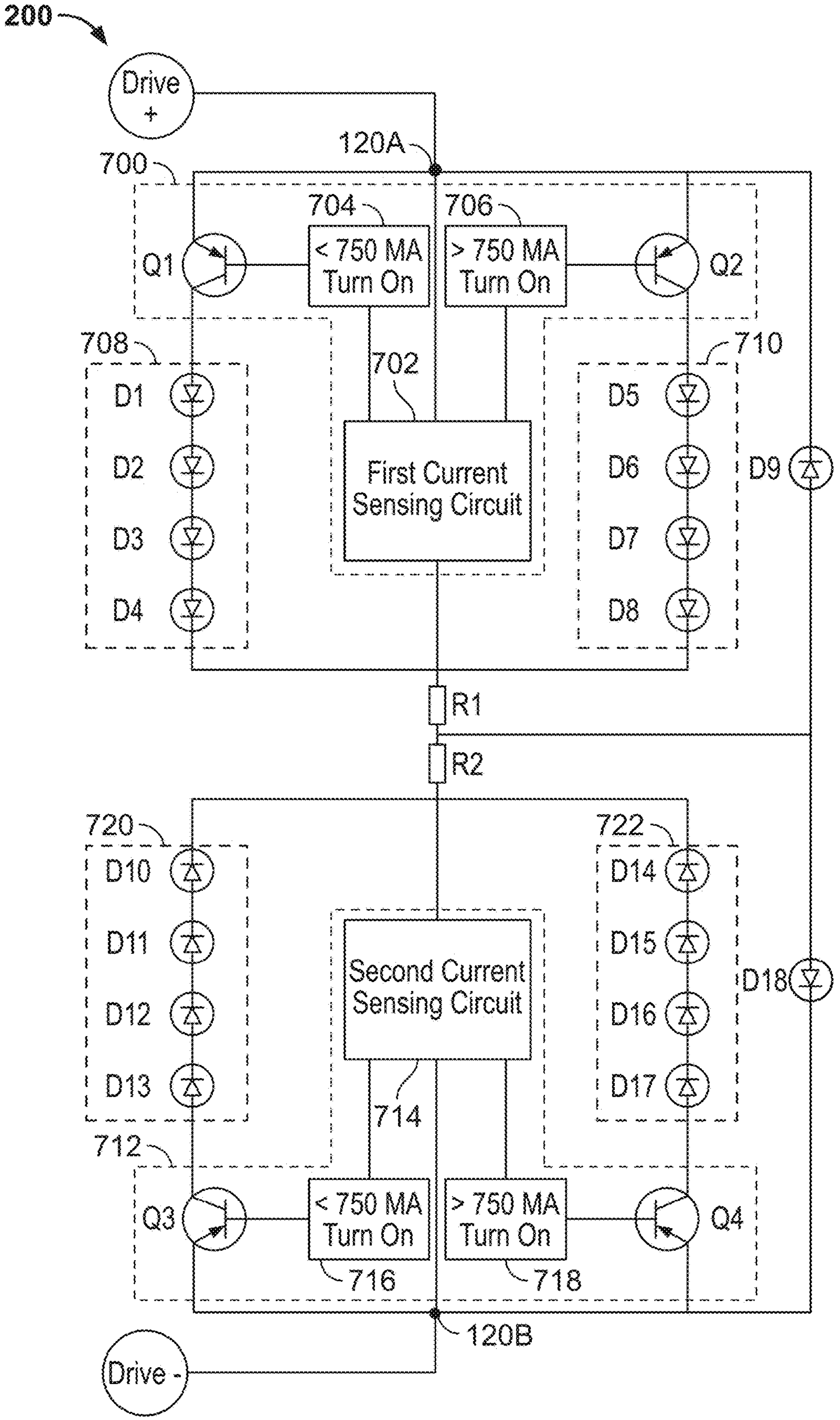

FIGS. 7A-7B illustrate an example lighting control system 200 implementing drive splitter circuits. The lighting control system 200 includes the driver circuit 104, the steering bridge 106, a first drive splitter circuit 700, a second drive splitter circuit 712, a first light source 708, a second light source 710, a third light source 720, and a fourth light source 722. The first drive splitter circuit 700, the first light source 708, and the second light source 710 may henceforth collectively be referred to as a first lighting array. The second drive splitter circuit 712, the third light source 720, and the fourth light source 722 may henceforth collectively be referred to as a second lighting array. The first lighting array and the second lighting array are connected between a positive input Drive+ and a negative input Drive−. A first input node 120A is connected to the positive input Drive+ and a second input node 120B is connected to the negative input Drive−. The first input node 120A acts as the input node to the lighting control system 200 when the lighting control system 200 is driven at a first polarity (e.g., a positive polarity). The second input node 120B acts as the input node to the lighting control system 200 when the lighting control system 200 is driven at a second polarity (e.g., a negative polarity). While not illustrated, in some implementations, the driver circuit 104 and the steering bridge 106 are controlled by the controller 102. The driver circuit 104 and the steering bridge 106 illustrated in FIG. 7A are substantially similar to the steering bridge 106 described above with respect to FIG. 3.

The first drive splitter circuit 700 may include a first current sensing circuit 702, a first comparator 704, a second comparator 706, a first switch Q1, and a second switch Q2. The first drive splitter circuit 700 may operate substantially similar to the drive splitter circuit 500 described above with respect to FIG. 5. A current flowing through either the first light source 708 or the second light source 710 flows through a first current sense resistor R1. The first current sensing circuit 702 detects a voltage value of the first current sense resistor R1 indicative of a value of the current flowing through the first light source 708 or the second light source 710.

The first light source 708 may include a first LED D1, a second LED D2, a third LED D3, and a fourth LED D4 connected in series and configured to allow the flow of current at a first polarity (e.g., a positive polarity). The second light source 710 may include a fifth LED D5, a sixth LED D6, a seventh LED D7, and an eight LED D8 connected in series and also configured to allow the flow of current at the first polarity. Accordingly, the control of the first switch Q1 and the second switch Q2 determine whether current flows through the first light source 708 or the second light source 710. In some instances, the first switch Q1 and the second switch Q2 may be controlled to allow current to flow through both the first light source 708 and the second light source 710 in parallel, based on the values of the first comparator 704 and the second comparator 706. A first blocking diode D9 is provided parallel to the first light source 708 and the second light source 710. Current bypasses the first light source 708 and the second light source 710 through the first blocking diode D9 when the current is a second polarity opposite the first polarity (e.g., flowing from the negative input Drive- to the positive input Drive+).

In the illustrated embodiment, the second lighting array is connected in anti-series to the first lighting array. The second drive splitter circuit 712 may include a second current sensing circuit 714, a third comparator 716, a fourth comparator 718, a third switch Q3, and a fourth switch Q4. The second drive splitter circuit 712 may operate substantially similar to the drive splitter circuit 500 described above with respect to FIG. 5. A current flowing through either the third light source 720 or the fourth light source 722 flows through a second sense resistor R2. The second current sensing circuit 714 detects a voltage value of the second current sense resistor R2 indicative of a value of the current flowing through the third light source 720 or the fourth light source 722.

The third light source 720 may include a tenth LED D10, an eleventh LED D11, a twelfth LED D12, and a thirteenth LED D13 connected in series and configured to allow the flow of current at a second polarity (e.g., a negative polarity). The second light source 710 may include a fourteenth LED D14, a fifteenth LED D15, a sixteenth LED D16, and a seventeenth LED D17 connected in series and also configured to allow the flow of current at the second polarity. Control of the third switch Q3 and the fourth switch Q4 determines whether current flows through the third light source 720 or the fourth light source 722. In some instances, the third switch Q3 and the fourth switch Q4 may be controlled to allow current to flow through both the third light source 720 and the fourth light source 722 in parallel, based on the values of the third comparator 716 and the fourth comparator 718. A second blocking diode D18 is provided parallel to the third light source 720 and the fourth light source 722. Current bypasses the third light source 720 and the fourth light source 722 when the current is a first polarity opposite the second polarity (e.g., flowing from the positive input Drive+ to the negative input Drive−).

Figure 8:
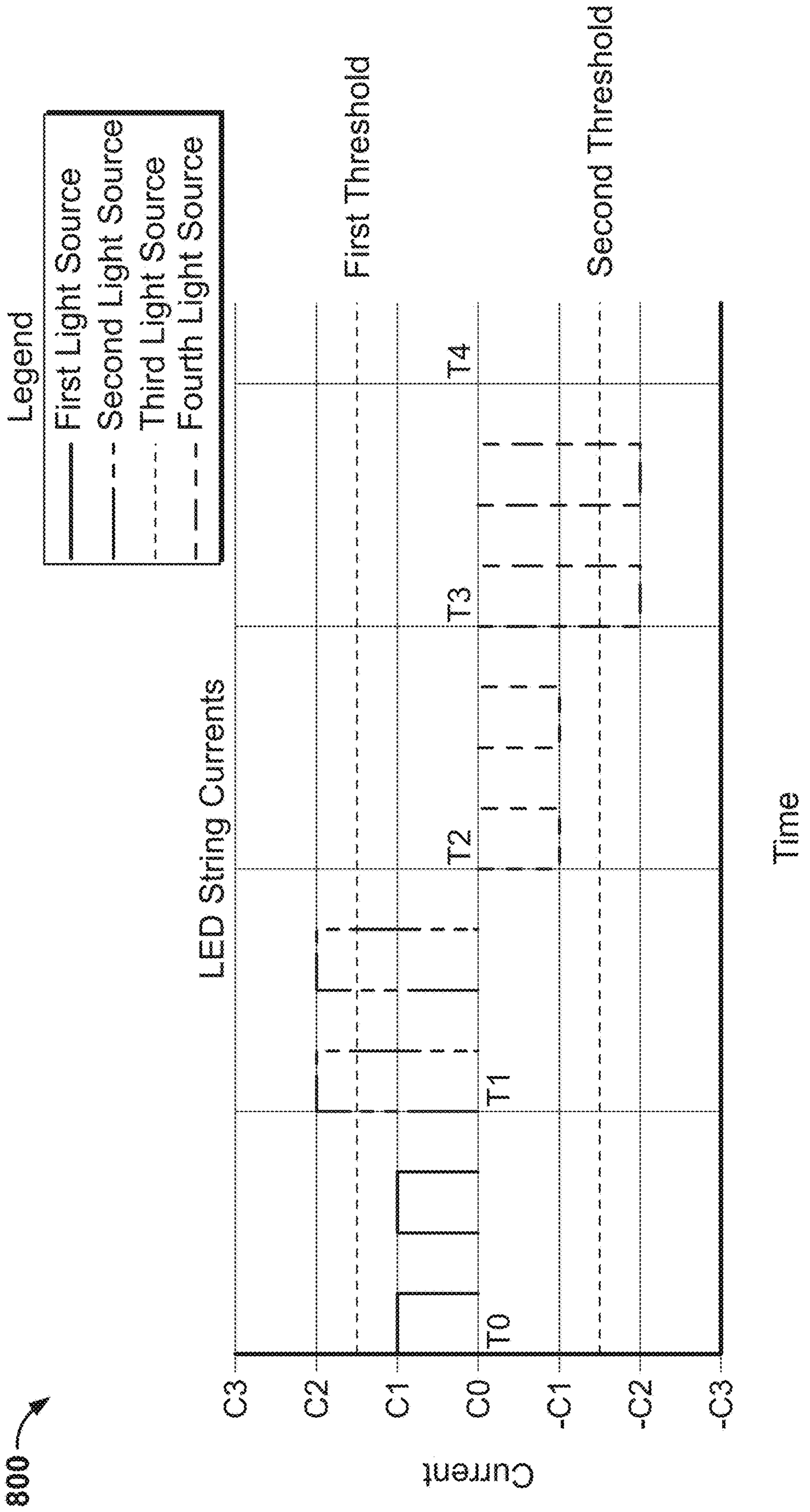
FIG. 8 is a graph of current commands for the lighting control system of FIGS. 7A-7B, in accordance with some embodiments.
Figure 9:
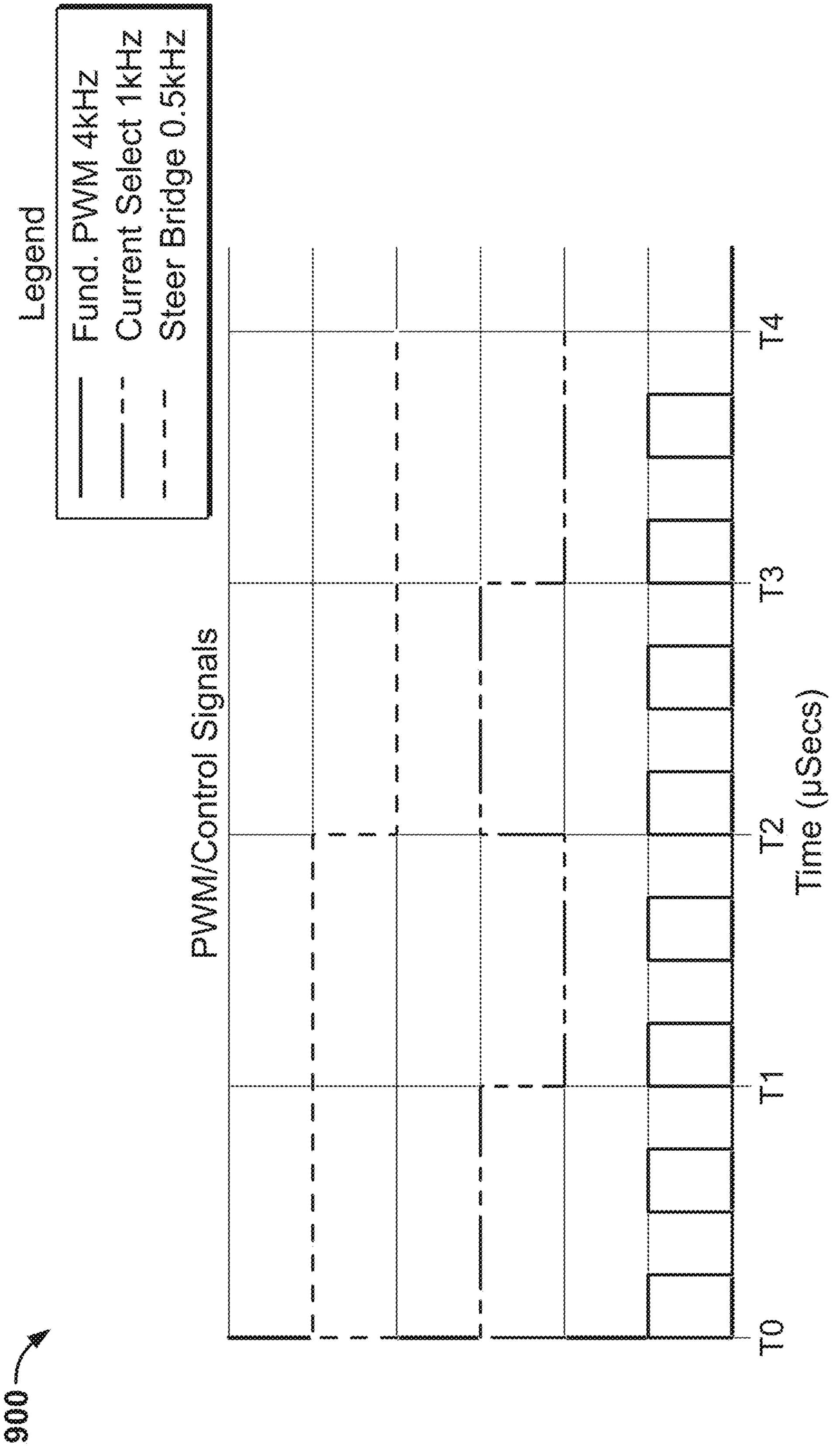
FIG. 9 is a graph of pulse width modulated (PWM) control signals for the lighting control system of FIGS. 7A-7B, in accordance with some embodiments.

The driver circuit 104 provides drive signals for each light source via the input node 120. FIG. 8 provides a graph 800 illustrating signals provided to the first light source 708, the second light source 710, the third light source 720, and the fourth light source 722. Additionally, FIG. 9 provides a graph 900 illustrating controls of the steering bridge 106 and the sensing circuits 702, 714 over the same time period of FIG. 8. Particularly, graph 900 illustrates a fundamental PWM signal used by the lighting control system 200, a current select PWM signal used by the sensing circuit 702, 714, and the steering drive command used to control the steering bridge 106.

From the time period T0 to T1, the driver circuit 104 provides a drive signal having a first magnitude C1. Additionally, from time period T0 to T1, the controller 102 controls the steering bridge 106 such that the polarity of the current is positive (e.g., a positive magnitude). As the polarity of the current is positive, current flows through the first lighting array and bypasses the second lighting array. In the example of FIGS. 8-9, the first magnitude C1 is less than the threshold of the first comparator 704 and second comparator 706. Accordingly, the first switch Q1 is controlled to an ON position and the second switch Q2 is controlled to an OFF position. From time T0 to T1, current flows only through the first light source 708.

From the time period T1 to T2, the driver circuit 104 provides a drive signal having a second magnitude C2. Additionally, from time period T1 to T2, the controller 102 controls the steering bridge 106 such that the polarity of the current is positive. In the example of FIGS. 8-9, the second magnitude C2 is greater than the threshold of the first comparator 704 and the second comparator 706. Accordingly, the first switch Q1 is controlled to an OFF position and the second switch Q2 is controlled to an ON position. From time T1 to T2, current flows only through the second light source 710.

From time period T2 to T3, the driver circuit 104 provides a drive signal having a third magnitude −C1. Additionally, from time period T2 to T3, the controller 102 controls the steering bridge 106 such that the polarity of the current is negative (e.g., a negative magnitude). As the polarity of the current is negative, current flows through the second lighting array and bypasses the first lighting array. In the example of FIGS. 8-9, the first magnitude −C1 is less than the threshold of the third comparator 716 and the fourth comparator 718. Accordingly, the third switch Q3 is controlled to an ON position and the fourth switch Q4 is controlled to an OFF position. From time T2 to T3, current flows only through the third light source 720.

From time period T3 to T4, the driver circuit 104 provides a drive signal having a fourth magnitude −C2. Additionally, from time period T3 to T4, the controller 102 controls the steering bridge 106 such that the polarity of the current is negative. In the example of FIGS. 8-9, the second magnitude −C2 is greater than the threshold of the third comparator 716 and the fourth comparator 718. Accordingly, the third switch Q3 is controlled to an OFF position and the fourth switch Q4 is controlled to an ON position. From time T3 to T4, current flows only through the fourth light source 722.

Figure 10:
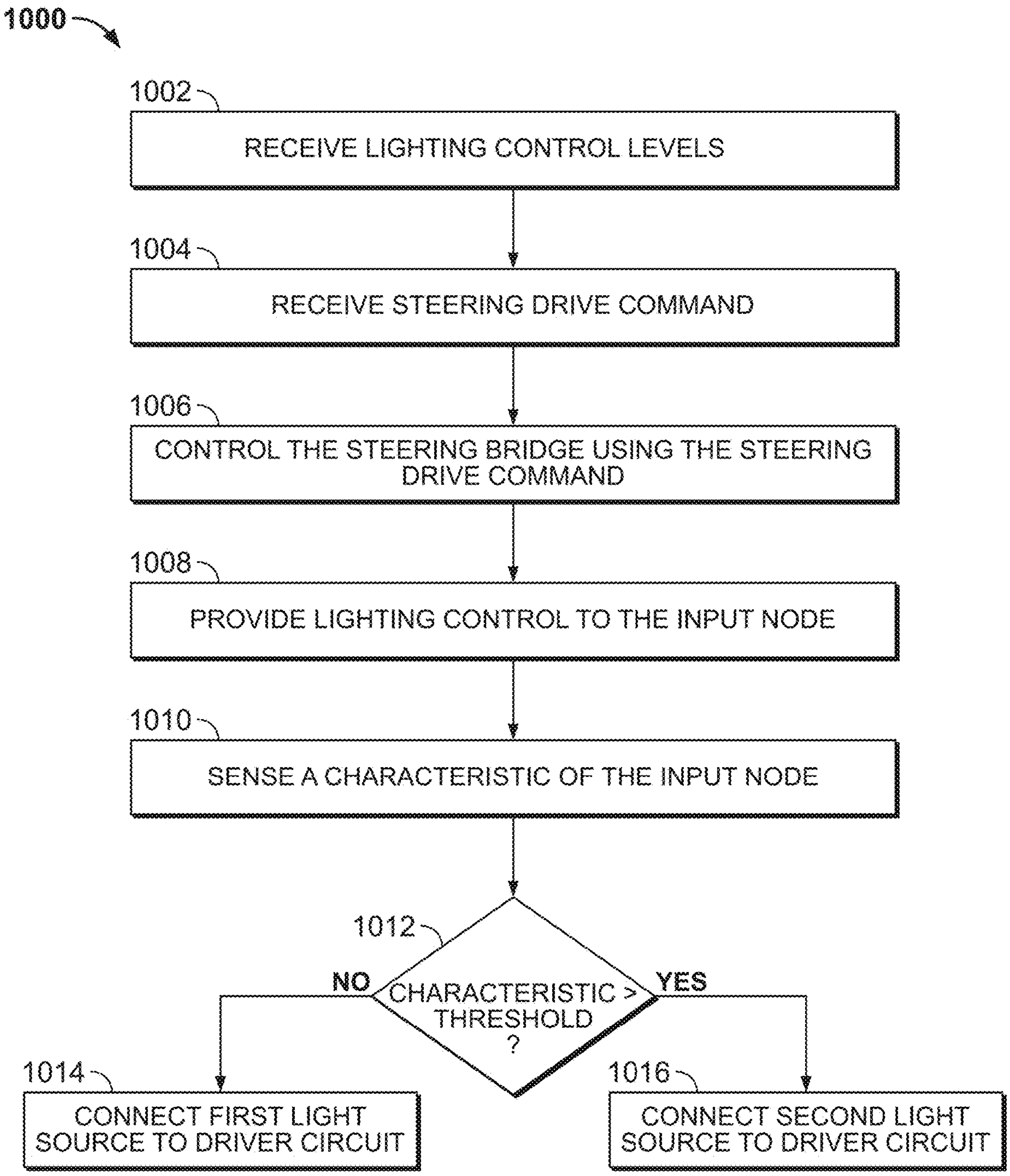
FIG. 10 is a flow chart of a method performed by the lighting control system of FIGS. 7A-7B, in accordance with some embodiments.

FIG. 10 provides an example method 1000 for operating the lighting control system 200 in accordance with some embodiments. The steps of the method 1000 are described in an iterative manner for descriptive purposes. Various steps described herein with respect to the method 1000 are capable of being executed simultaneously, in parallel, or in an order that differs from the illustrated serial and iterative manner of execution.

At block 1002, the controller 102 receives lighting control levels for each of the light sources. For example, the controller 102 receives a first control level for the first light source 708, a second control level for the second light source 710, a third control level for the third light source 720, and a fourth light source 722. In some instances, the controller 102 provides the lighting control levels to the driver circuit 104.

At block 1004, the controller 102 receives the steering drive command for driving the steering bridge 106. At block 1006, the controller 102 controls the steering bridge 106 using the steering drive command.

At block 1008, the driver circuit 104 provides a lighting control signal to the input node 120. For example, the driver circuit 104 provides the current signals illustrated within graph 800 to the input node 120. At block 1010, the drive splitter circuit senses a current of the input node 120. For example, the first current sensing circuit 702 senses the current of the input node 120, the second current sensing circuit 714 senses the current of the input node 120, or both the first current sensing circuit 702 and the second current sensing circuit 714 sense the current of the input node 120.

At block 1012, the drive splitter circuit compares the current of the input node 120 to a threshold. For example, the first comparator 704, the second comparator 706, the third comparator 716, and the fourth comparator 718 each compare the current of the input node 120 to their respective thresholds. When the current of the input node 120 is less than the threshold, the drive splitter circuit proceeds to block 1014. When the current of the input node 120 is greater than the threshold, the drive splitter circuit proceeds to block 1016.

At block 1014, the drive splitter circuit connects the first light source to the driver circuit 104. For example, the first comparator 704 controls the first switch Q1 to an ON position to connect the first light source 708 to the input node 120. In some instances, the third comparator 716 controls the third switch Q3 to an ON position to connect the third light source 720 to the input node 120. At block 1016, the drive splitter circuit connects the second light source to the driver circuit 104. For example, the second comparator 706 controls the second switch Q2 to an ON position to connect the second light source 710 to the input node 120. In some instances, the fourth comparator 718 controls the fourth switch Q4 to an ON position to connect the fourth light source 722 to the input node 120. In some embodiments, once the driver circuit 104 is connected to the first light source (block 1014) or the second light source (block 1016), method 1000 may cycle back to block 1002.

Figure 11:
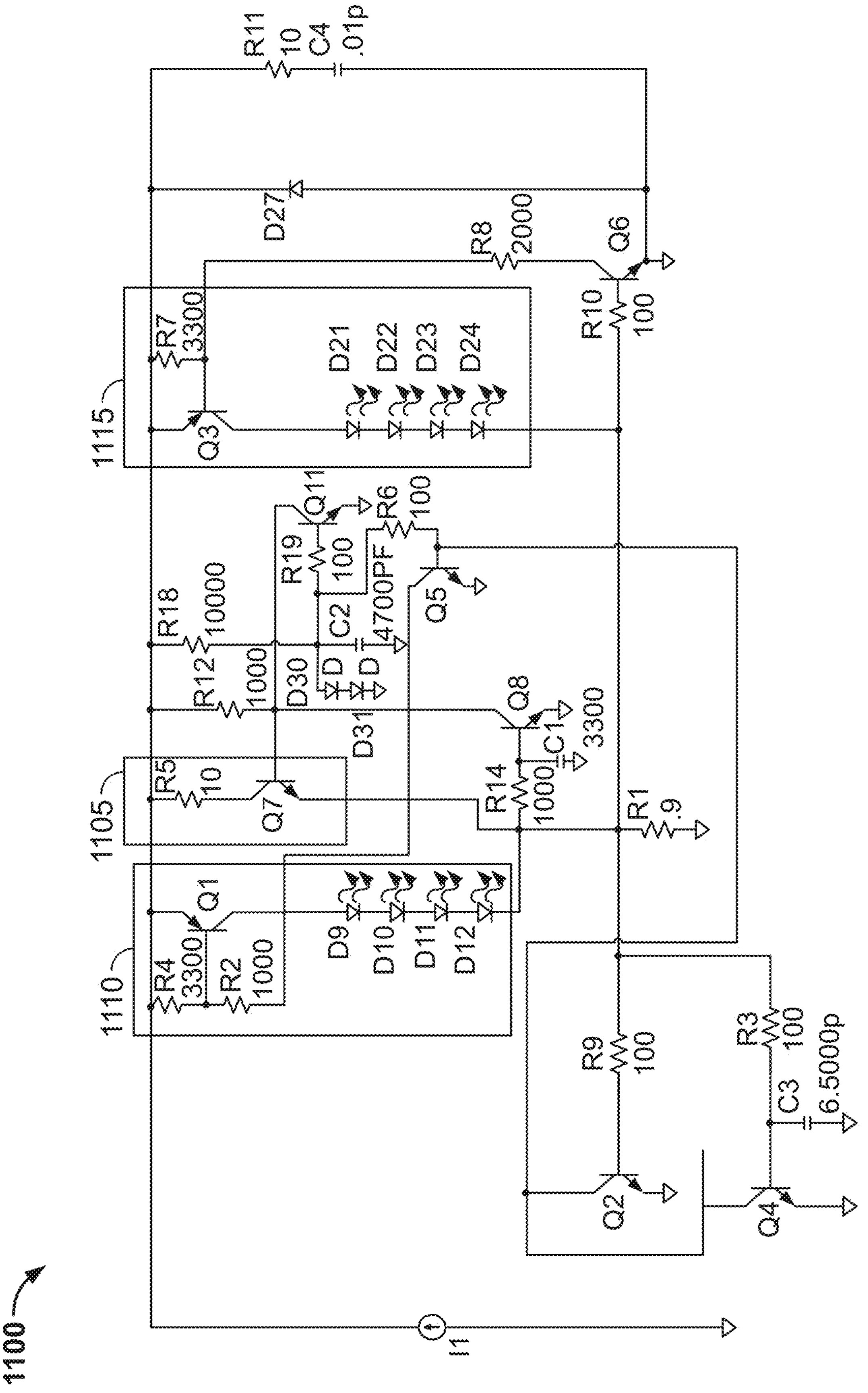
FIG. 11 is a circuit diagram of a lighting array, in accordance with some embodiments.
Figure 12:
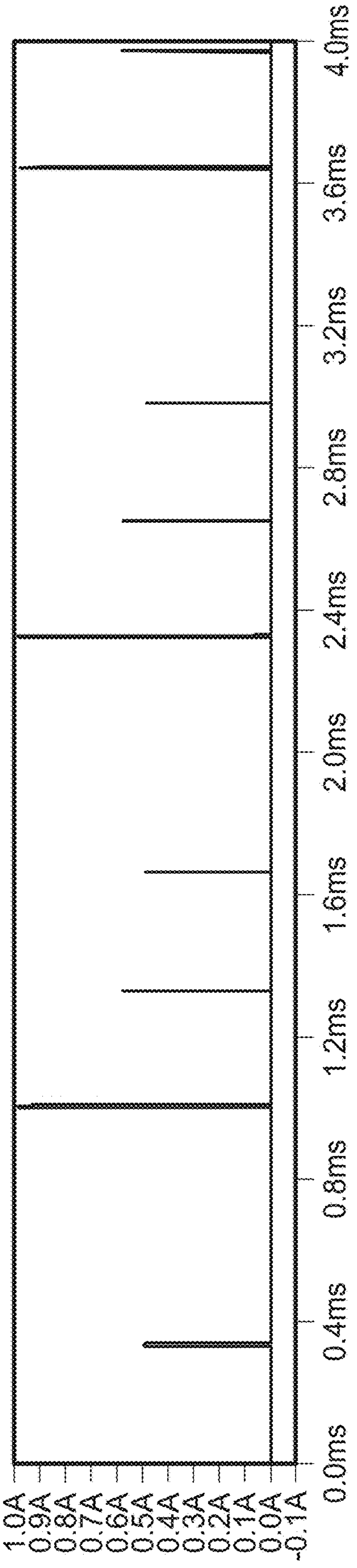
FIG. 12 is a graph illustrating a current through a delay current circuit in the lighting array of FIG. 11, in accordance with some embodiments.

In some embodiments, the lighting control system further includes a delay circuit to delay current to the lighting array. FIG. 11 illustrates a circuit diagram for an example lighting control system 1100. The lighting control system 1100 includes a delay circuit 1105, a first lighting circuit 1110, and a second lighting circuit 1115. The delay circuit 1105 includes a delay transistor Q7 connected in series with a resistor R5. When the driver circuit 104 begins to provide drive signals, the delay circuit 1105 provides an initial path for current until the current level has reached a desired value. For example, when the driver circuit 104 begins to provide drive signals, current flows through the delay circuit 1105 for a predetermined time period (e.g., a delay period). FIG. 12 illustrates an example plot of current through the delay circuit 1105 at the start of each drive cycle.

Figure 13:
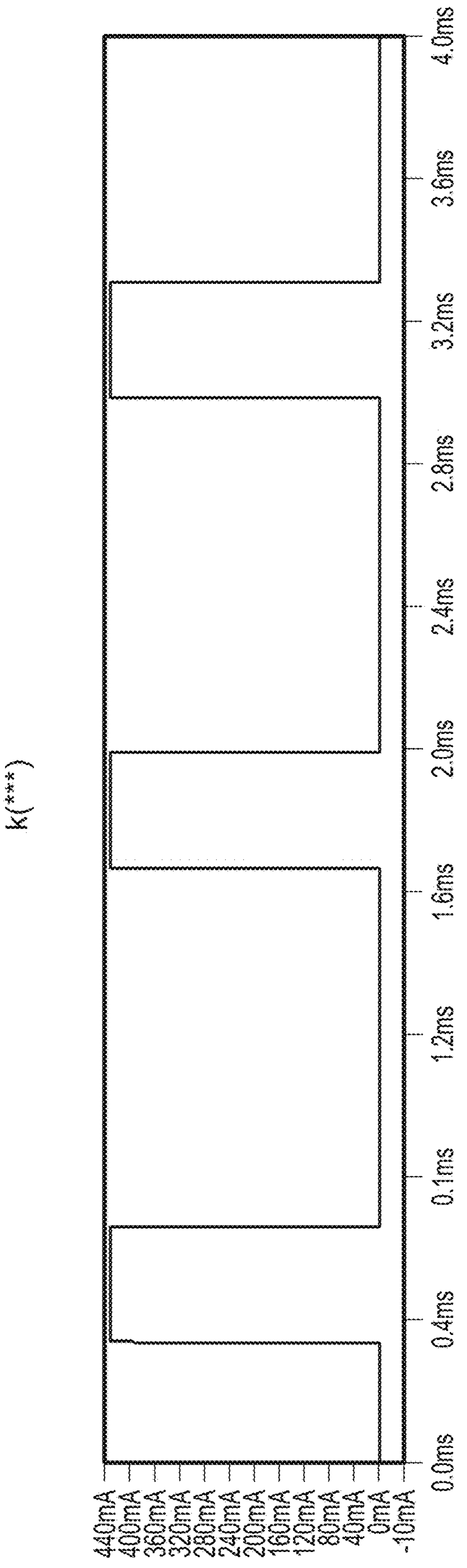
FIG. 13 is a graph illustrating a current through a first lighting circuit in the lighting array of FIG. 11, in accordance with some embodiments.

The first lighting circuit 1110 includes a first switch Q1 for controlling whether the first lighting circuit 1110 receives current. For example, at the end of the delay period, if the current through the delay circuit 1105 is below the current threshold (for example, 750 mA), the first switch Q1 is controlled to provide current to the first lighting circuit 1110. FIG. 13 illustrates an example plot of current through the first lighting circuit 1110 at the end of the delay period.

Figure 14:
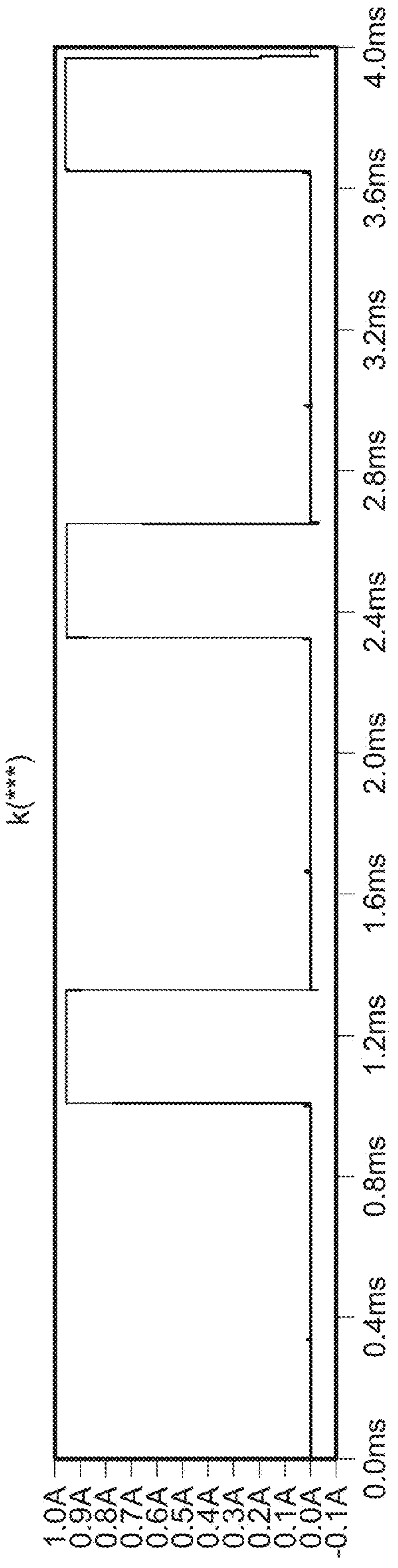
FIG. 14 is a graph illustrating a current through a second lighting circuit in the lighting array of FIG. 11, in accordance with some embodiments.
Figure 15:
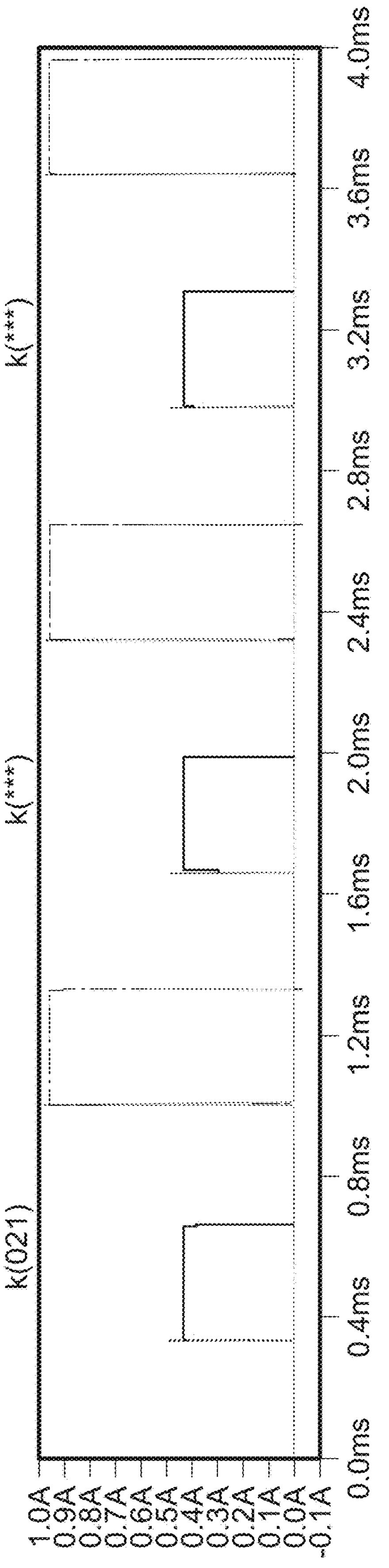
FIG. 15 is a graph of FIGS. 12-14 superimposed on a single plot.

The second lighting circuit 1115 includes a second switch Q3 for controlling whether the second lighting circuit 1115 receives current. For example, at the end of the delay period, if the current through the delay circuit 1105 is above the current threshold, the second switch Q3 is controlled to provide current to the second lighting circuit 1115. FIG. 14 illustrates an example plot of current through the second lighting circuit 1115 at the end of the delay period. FIG. 15 illustrates FIG. 12, FIG. 13, and FIG. 14 superimposed on a single plot. As seen in FIG. 15, at the end of each delay period, either the first lighting circuit 1110 or the second lighting circuit 1115 are controlled based on the magnitude of the current.

While embodiments described herein have primarily referred to sensing the current of the input node 120 (e.g., the current provided by the driver circuit 104), in some instances, other characteristics of the input node 120 are monitored to determine whether to connect light sources to the driver circuit 104. For example, a voltage value provided by the driver circuit 104 to the input node 120 may be sensed by a characteristic sensing circuit. The voltage value is then compared to a threshold. Light sources are connected to the input node 120 based on the voltage value. As another example, a duty cycle of the current provided by the driver circuit 104 to the input node 120 may be varied. The duty cycle is then compared to a threshold. Light sources are connected to the input node 120 based on the duty cycle.

Light sources described herein may be controlled herein to provide different shades of white light (e.g., tunable light), color mixture, color fading, and similar light operations. Each connected light source may be any light color, such as a combination of red lights, green lights, blue lights, and white lights of varying shades and warmth. While each light source is controlled independently and at a different time, the light sources may be controlled at a frequency high enough such that, to a viewer of the luminaire, each light source remains on.

Luminaires

Figure 16:
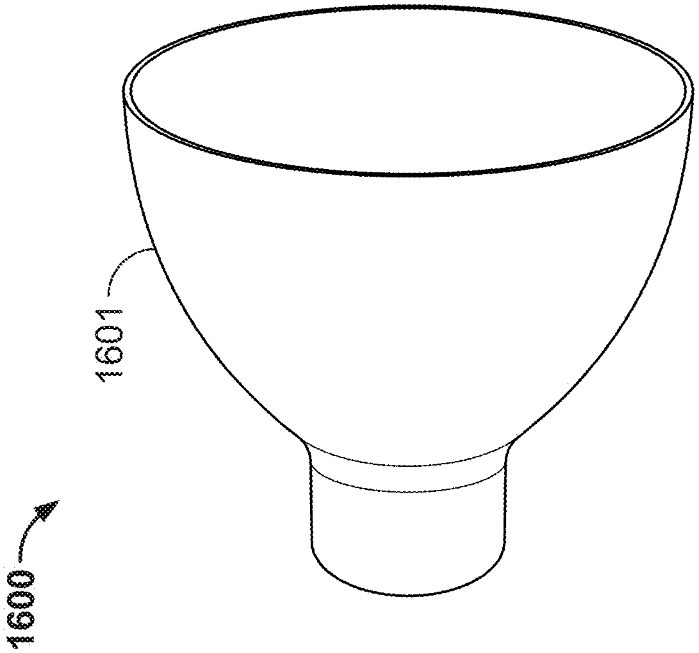
FIG. 16 is an illustration of a luminaire housing, in accordance with some embodiments.
Figure 17:
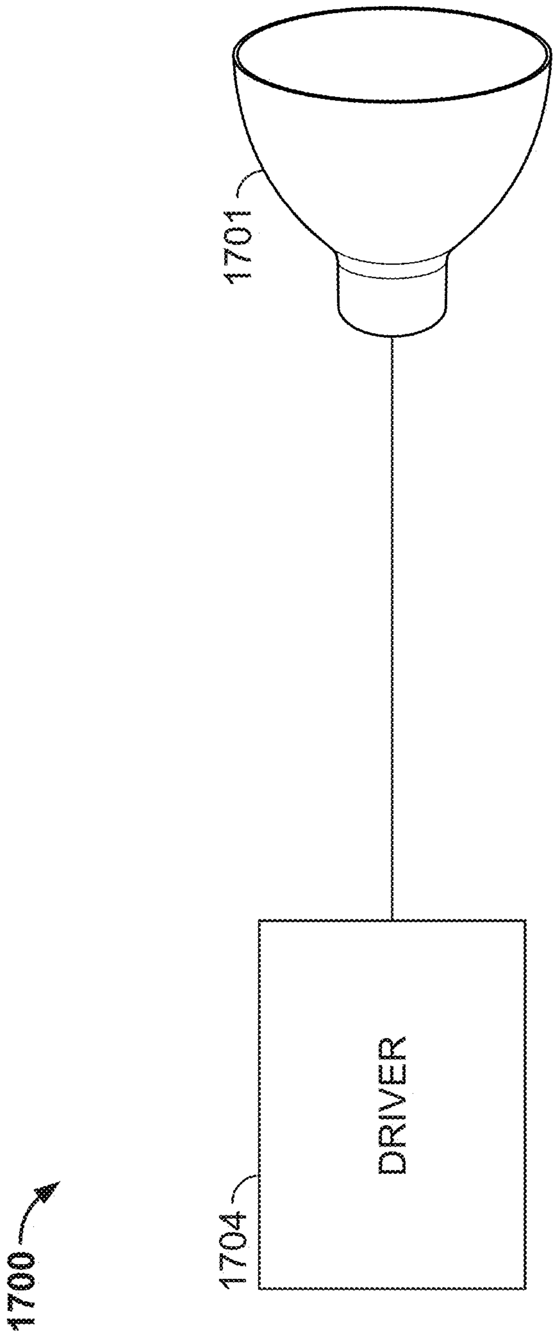
FIG. 17 is an illustration of a luminaire housing connected to a driver, in accordance with some embodiments.

Lighting controls systems described herein may be implemented within multiple different types of luminaires. For example, FIG. 16 illustrates a luminaire 1600 according to one implementation. In FIG. 16, all components (or substantially all of the components) of the lighting control system 100 are situated within the housing 1604 of the luminaire 1600. However, in some instances, certain components of the lighting control system 100 may instead be situated outside of the housing 1604. For example, FIG. 17 illustrates a light system 1700 having a driver 1704 situated outside of a luminaire housing 1701. In some instances, only the lighting sources (such as first light source 108 and the second light source 110) are situated within the luminaire housing 1701, while control elements (such as the controller 102, the driver circuit 104, and the steering bridge 106) are located external to the luminaire housing 1701.

Figure 18:
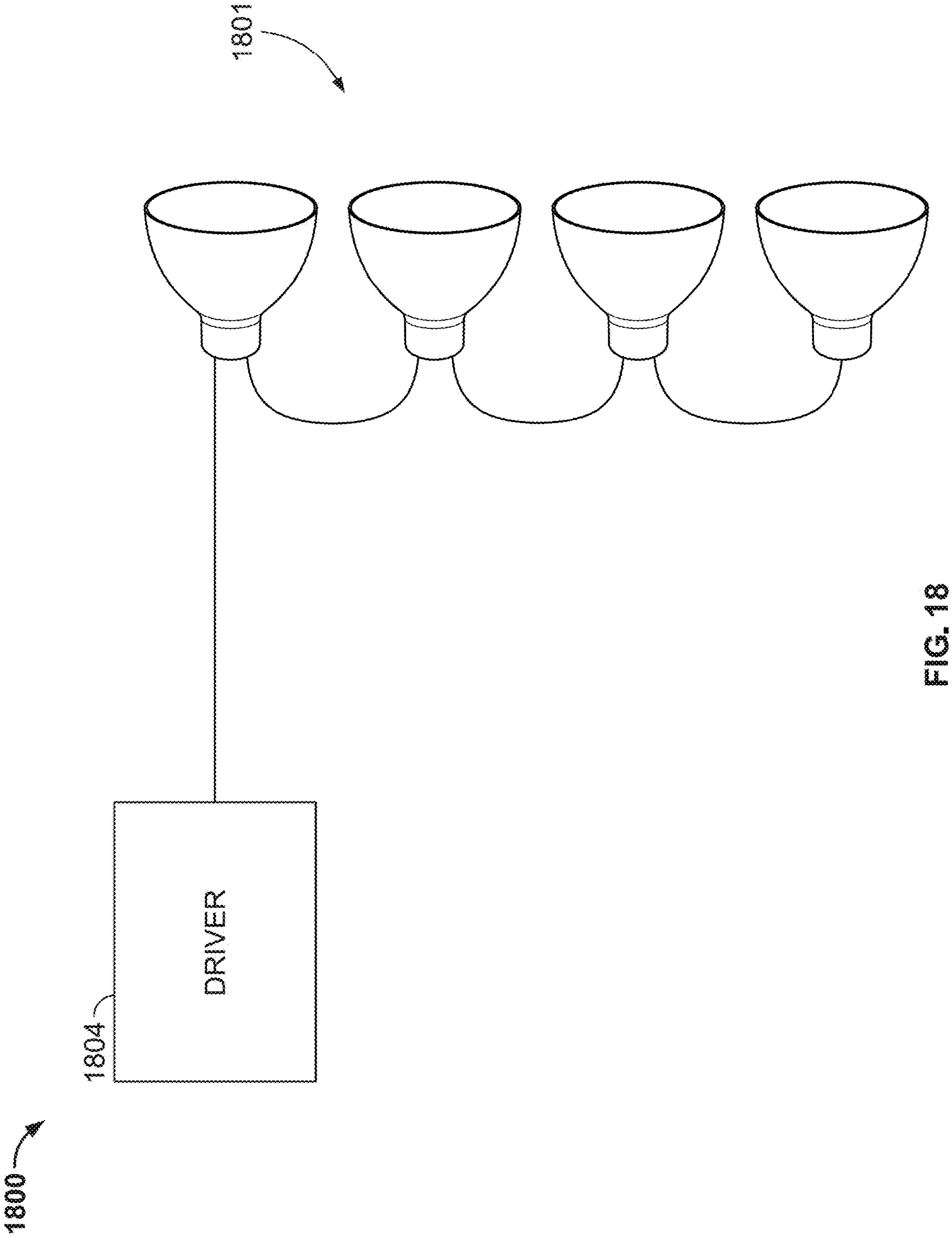
FIG. 18 is an illustration of a plurality of luminaire housings connected to a driver, in accordance with some embodiments.

Additionally, in some implementations, multiple luminaire housings are connected in series to control elements. For example, FIG. 18 illustrates a light system 1800 having a driver 1804 and a plurality of luminaire housings 1801. In some embodiments, each of the luminaire housings 1801 house a single lighting source (such as housing only the first light source 108 or the second light source 110). In other instances, each of the luminaire housings 1801 may be identical such that they output the same light based on controls from the driver 1804. The control elements (such as the controller 102, the driver circuit 104, and the steering bridge 106) may be located in the driver 1804.

Figure 19:
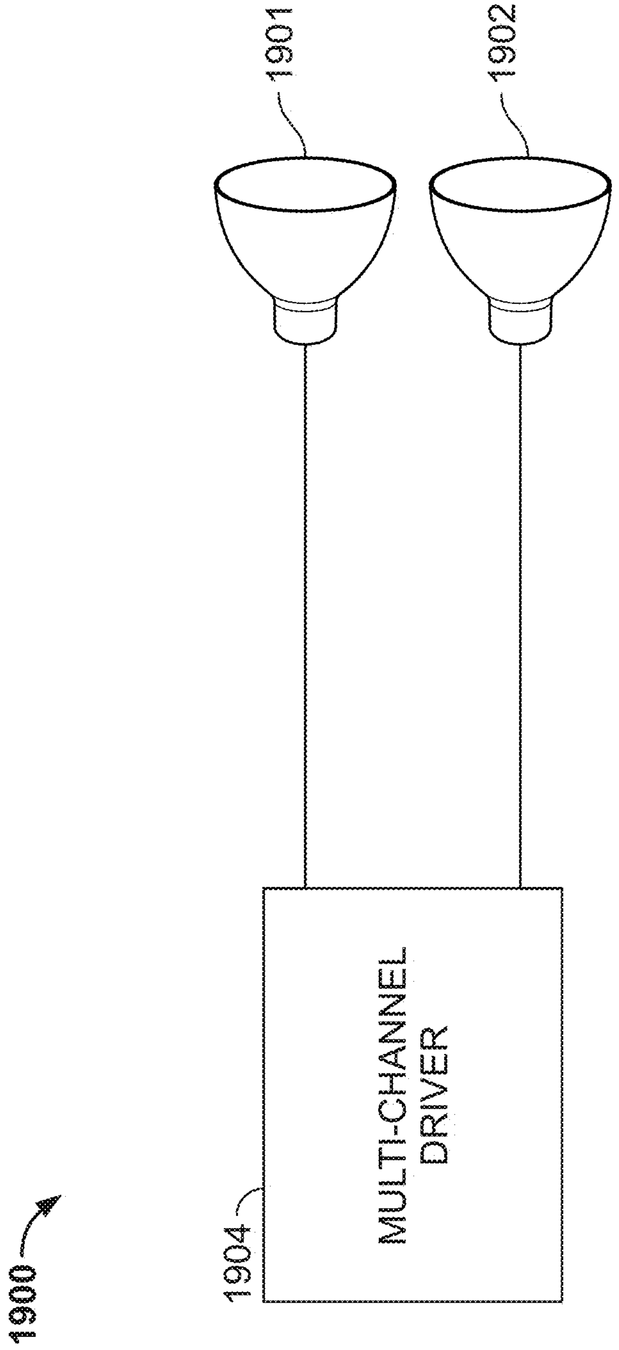
FIG. 19 is an illustration of a plurality of luminaire housings connected to a multi-channel driver, in accordance with some embodiments.

In some implementations, the driver 104 is a multi-channel driver. For example, FIG. 19 illustrates a light system 1900 having a multi-channel driver 1904 for controlling a first luminaire 1901 and a second luminaire 1902. However, the multi-channel driver 1904 may control more than two luminaires based on the number of luminaires included in the light system 1900. The multi-channel driver 1904 may include the controller 102, the driver 104, and the steering bridge 106. However, rather than controlling all luminaires using a single input, the first luminaire 1901 and the second luminaire 1902 are connected to the multi-channel driver 1904 at different inputs.

Thus, embodiments described herein provide, among other things, a lighting control system having a driver for independently controlling multiple light sources. Various features and advantages are set forth in the following claims.

What is claimed is:

1. A lighting control system comprising:

an input configured to be driven in a first polarity and a second polarity reversed from the first polarity;

a first light source connected to the input and configured to generate light when driven at the first polarity;

a second light source connected to the input and configured to generate light when driven at the second polarity;

a steering bridge connected to the input and configured to control the polarity of the input;

a sensing circuit configured to sense a characteristic of the input; and a controller connected to the steering bridge and the sensing circuit, the controller configured to:

control, based on a steering drive command, the steering bridge, receive, via the sensing circuit, a signal indicative of the characteristic of the input, connect the first light source to the input when the characteristic of the input is less than a threshold, connect the second light source to the input when the characteristic of the input is greater than or equal to the threshold, and provide, to the input, lighting control signals to independently control the first light source and the second light source.

2. The lighting control system of claim 1, wherein the controller is configured to:

receive a first control level associated with the first light source;

receive a second control level associated with the second light source; and generate the lighting control signals based on the first control level and the second control level.

3. The lighting control system of claim 2, wherein the controller is configured to:

control the steering bridge based on the steering drive command for a first time period, wherein, during the first time period, the input is driven in the first polarity; and control the steering bridge based on the steering drive command for a second time period, wherein, during the second time period, the input is driven in the second polarity.

4. The lighting control system of claim 1, further comprising:

a constant current driver circuit connected between the controller and the steering bridge, wherein the controller is configured to provide the lighting control signals to the constant current driver circuit.

5. The lighting control system of claim 1, wherein the first light source and the second light source are connected in anti-parallel.

6. The lighting control system of claim 1, wherein the first light source and the second light source are connected in anti-series.

7. The lighting control system of claim 1, wherein the first light source includes a first plurality of light emitting diodes, and wherein the second light source includes a second plurality of light emitting diodes.

8. A lighting control system comprising:

a first light source;

a second light source;

a driver circuit configured to independently drive the first light source and the second light source;

a steering bridge configured to control a polarity of current provided to the first light source and the second light source; and a sensing circuit configured to:

sense a characteristic of the driver circuit, connect the first light source to the driver circuit when the characteristic of the driver circuit is less than a threshold, and connect the second light source to the driver circuit when the characteristic of the driver circuit is greater than or equal to the threshold.

9. The lighting control system of claim 8, wherein the characteristic of the driver circuit is a current value provided by the driver circuit.

10. The lighting control system of claim 8, wherein the characteristic of the driver circuit is a voltage value provided by the driver circuit.

11. The lighting control system of claim 8, further comprising a third light source, and wherein the sensing circuit is further configured to:

connect the third light source to the driver circuit when the characteristic of the driver circuit is greater than a second threshold, and disconnect the second light source from the driver circuit when the characteristic of the driver circuit is greater than the second threshold.

12. A lighting control system comprising:

an input configured to be driven in a first polarity and a second polarity reversed from the first polarity;

a first light source connected to the input and configured to generate light when driven at the first polarity;

a second light source connected in anti-series to the first light source and configured to generate light when driven at the second polarity;

a steering bridge connected to the input and configured to independently drive the first light source and the second light source;

a sensing circuit configured to sense a characteristic of the input; and a controller connected to the steering bridge and the input, the controller configured to:

control, via the steering bridge, the polarity of the input, receive, via the sensing circuit, a signal indicative of the characteristic of the input, connect the first light source to the input when the characteristic of the input is less than a threshold, and connect the second light source to the input when the characteristic of the input is greater than or equal to the threshold.

13. The lighting control system of claim 12, wherein the controller is configured to switch a polarity of the input by providing a pulse width modulated (PWM) signal to the input.

14. The lighting control system of claim 12, wherein the controller is configured to:

receive a first control level associated with the first light source;

receive a second control level associated with the second light source; and control the steering bridge based on the first control level and the second control level.

15. The lighting control system of claim 14, wherein the controller is configured to control the steering bridge based on the first control level by providing a first current value less than the threshold to the input, and wherein the controller is configured to control the steering bridge based on the second control level by providing a second current value greater than the threshold to the input.

16. The lighting control system of claim 12, wherein the first light source includes a first plurality of light emitting diodes, and wherein the second light source includes a second plurality of light emitting diodes.

17. The lighting control system of claim 12, wherein the characteristic of the driver circuit is a current value provided by the driver circuit.

18. The lighting control system of claim 12, wherein the characteristic of the driver circuit is a voltage value provided by the driver circuit.

19. The lighting control system of claim 12, wherein the first light source and the second light source are connected at a node, and wherein the luminaire further comprises:

a third light source connected to the input and in parallel to the first light source, the third light source configured to generate light when driven at the second polarity; and a fourth light source connected to the node and in parallel to the second light source, the fourth light source configured to generate light when driven at the first polarity.

20. The lighting control system of claim 19, wherein the controller is configured to:

connect the third light source to the steering bridge when the characteristic of the steering bridge is greater than or equal to the threshold, and connect the fourth light source to the steering bridge when the characteristic of the steering bridge is less than the threshold.

* * * * *